United States Patent [19]

Heimbrodt et al.

[11] Patent Number: 4,827,976
[45] Date of Patent: May 9, 1989

[54] VACUUM DISTRIBUTOR BOX

[75] Inventors: Klaus-J. Heimbrodt; Dieter Simon, both of Treuchtlingen; Dieter Feichtiger, Aidlingen; Rudi Kneib, Sindelfingen; Günther Weikert, Weil der Stadt; Wolfgang Schneider, Calw-Stammheim; Ruediger Hoffmann, Sindelfingen; Theodor Reinhard, Boeblingen, all of Fed. Rep. of Germany

[73] Assignee: Daimler-Benz Aktiengesellschaft, Stuttgart, Fed. Rep. of Germany

[21] Appl. No.: 157,629

[22] Filed: Feb. 18, 1988

[30] Foreign Application Priority Data

Feb. 18, 1987 [DE] Fed. Rep. of Germany ....... 3705060

[51] Int. Cl.[4] .................. F16K 11/22; F16L 37/28
[52] U.S. Cl. .................................... 137/606; 137/907; 251/149.6
[58] Field of Search .............. 137/602, 606, 883, 907; 251/149.6

[56] References Cited

U.S. PATENT DOCUMENTS

| 2,263,293 | 11/1941 | Ewald | 251/149.6 |
|---|---|---|---|
| 3,470,893 | 10/1969 | Nelson | 137/602 X |
| 3,552,436 | 1/1971 | Stewart | 137/883 |
| 4,120,480 | 10/1978 | Ando et al. | 137/907 X |
| 4,123,613 | 10/1978 | Reinhard et al. | 137/606 X |
| 4,129,143 | 12/1978 | Hoffmann | |

FOREIGN PATENT DOCUMENTS

| 683540 | 11/1939 | Fed. Rep. of Germany . | |
| 2617132 | 4/1976 | Fed. Rep. of Germany . | |
| 2628314 | 6/1976 | Fed. Rep. of Germany . | |
| 2557022 | 6/1977 | Fed. Rep. of Germany . | |
| 3031625 | 8/1980 | Fed. Rep. of Germany . | |
| 3137969 | 3/1983 | Fed. Rep. of Germany . | |
| 7918382 | 3/1980 | France . | |
| 629185 | 9/1949 | United Kingdom | 137/883 |
| 2166840 | 5/1986 | United Kingdom . | |

Primary Examiner—Stephen Hepperle
Attorney, Agent, or Firm—Barnes & Thornburg

[57] ABSTRACT

In a vacuum distributor box with a suction connection and several vacuum connections, all the vacuum connections are equipped with non-return valves open only when vacuum lines are inserted, both the seals of the box housing itself and the those of the vacuum lines relative to the box housing and the valve sealing seats of the non-return valves being incorporated in a diaphragm seal clamped on all sides between two housing parts.

7 Claims, 3 Drawing Sheets

VACUUM DISTRIBUTOR BOX

BACKGROUND AND SUMMARY OF THE INVENTION

The invention relates to a vacuum distributor box of the type having a suction connection and several vacuum connections, the vacuum connections accommodating selective connection of vacuum lines which open one way valves when inserted.

A vacuum distributor box of the relevant generic type is described in German Published Unexamined application (DE-OS) No. 2,617,132. It has several vacuum connections which are connected, in groups, to a common vacuum chamber and which cannot be closed off from one another within the groups. For the selective connection of a test tool, each of these groups have assigned to it a further (test) vacuum connection which can be closed off from the vacuum chamber by means of a non-return valve. This non-return valve is prestressed against its sealing seat with such a high spring force that even the maximum differential-pressure force occurring as a result of the vacuum on the chamber side and the atmospheric pressure from outside cannot open it counter to the spring force. Only as a result of mechanical action, in particular the insertion of the vacuum line of the test tool, is the non-return valve opened, thus freeing the respective vacuum connection. When the line is removed again, the non-return valve closes immediately.

Such non-return valve safeguards for fluid connections are also known for plug-in hose or pipe couplings (for example, see German Patent DE-PS 683,540). However, the disadvantage common to the known designs is that a relatively high outlay for sealing off the non-return valves, on the one hand, and the insertable fluid connections, on the other hand, is necessary. In vacuum distributor boxes with groups of vacuum connections to common vacuum chambers, all the vacuum connections of a group must also be occupied, hence inoperative connections are occupied, for example, by additional dummy plugs, in order to prevent a vacuum connection left free and the common vacuum chamber from causing the other connections of the group to be vented.

An object of the invention is to design a vacuum distributor box of the relevant generic type, so that, without additional measures, variable numbers of vacuum lines can be connected to common vacuum chambers at only a low outlay for sealing off the vacuum connections and vacuum lines.

This object is achieved by making the housing of the vacuum distributor box in two parts sealed off relative to the outside by an elastic diaphragm seal clamped between the two housing parts. This diaphragm seal is provided with a number of perforations in the respective mouth region of the vacuum connections, the diaphragm sealing faces serving on the one hand as valve sealing seats for a non-return valve at the respective vacuum connection and as annular seals for a connected vacuum line.

Other advantageous developments of the vacuum distributor box according to the invention includes provision of a respective non-return valve which also operatively engages the diaphragm seal.

When each individual vacuum connection is equipped with a non-return valve, by means of the claimed design the outlay for sealing off the housing of the vacuum distributor box, the non-return valve seats and the vacuum lines to be inserted is greatly reduced in an advantageous way because a one-piece diaphragm seal is clamped on all sides between the two housing parts and also has perforations, the number and position of which correspond to the number and spatial arrangement of the vacuum connections. At the same time, the edges of the perforations on the one hand form the valve sealing seats for the non-return valves and on the other hand come sealingly up against inserted vacuum lines. The diaphragm seal thus, in one piece, performs three sealing functions simultaneously. The number of seals to be used and of the number precision-machined sealing faces in the housing is markedly reduced, and it therefore also becomes much simpler to assemble the vacuum distributor box.

In the generic state of the art represented by German Published Unexamined Application (DE-OS) No. 2,617,132, the common vacuum chambers of the vacuum connections are each protected against the penetration of ambient pressure from the suction side by means of a protective valve. In an advantageous development of the vacuum distributor box according to the invention, this sealing function can be the fourth one performed by the diaphragm seal.

Admittedly, it is already known to form a non-return protection valve of a vacuum chamber with several vacuum connections, as a concertina segment, in a diaphragm seal which is clamped between two housing halves, see German Published Unexamined Patent Application (DE-OS) No. 3,031,625. Nevertheless, the known arrangement does not suggest providing the diaphragm seal with further perforations and conveying a suction-air flow through the diaphragm seal three times. Moreover, equipping vacuum connections with non-return valves which can only be opened mechanically as a result of the insertion of vacuum lines cannot be derived from this known design of a vacuum distributor box.

It is now possible to remove, exchange or reinsert vacuum lines even when the vacuum distributor box according to the invention is installed and subjected to a vacuum, without an increase in pressure occurring at the same time in the other vacuum connections or vacuum consumers.

A clip-on connection between the vacuum distributor box and the vacuum lines is conducive to simple handling, whilst the claimed design of the non-return valve bodies as cones with recesses makes it possible to use conventional pipe ends on the vacuum lines, without approximately centrally arranged actuating tappets or the like having to be provided for pushing back and opening the non-return valves, as applies, for example, to the connections of tyre-pressure test instruments.

Other objects, advantages and novel features of the present invention will become apparent from the following detailed description of the invention when considered in conjunction with the accompanying drawings.

DETAILED DESCRIPTION OF THE DRAWINGS

Figure 1:
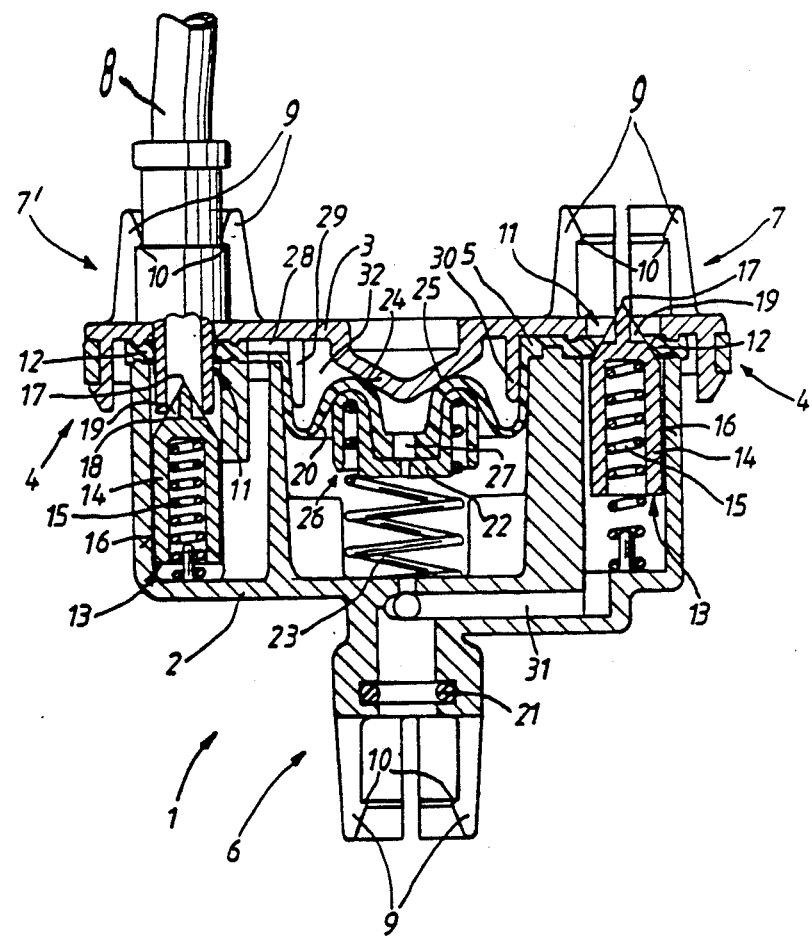
FIG. 1 is a schematic sectional side view of a vacuum distributor box constructed according to a first embodiment of the invention.

Referring to FIG. 1, a vaccum distributor box 1 is composed of a housing bottom part 2 and a cover 3 which are interlocked by means of clip-on connections 4 distributed over the outer periphery of the vacuum distributor box 1 and which clamp a diaphragm seal 5 on all sides between their outer walls for the purpose of sealing off the joint. On the housing bottom part 2 there is a single suction connection 6, to which a vacuum generator (not shown) can be connected. The cover 3 has several vacuum connections 7, 7' only one of each of these being shown, and a vacuum line 8 is inserted into the vacuum connection 7' and secured in it by means of a locking connection provided on all the vacuum connections 7, 7' and on the suction connection 6 and consisting of resilient retention tongues 9 with locking noses 10.

In the mouth region of the vacuum connections, 7, 7' the diaphragm seal 5 rests against the cover 3 on the inside and is provided with perforations 11 which have bead-shaped edges 12 resembling O-rings. The perforations 11 are arranged axially in line with the vacuum connections 7, 7'.

Each vacuum connection 7, 7' has assigned to it a non-return valve 13 in each case composed of a valve body 14, a valve spring 15, a valve guide 16 in the housing bottom part 2 and a valve sealing seat formed by the bead-shaped edge 12 of the corresponding perforation 11 in the diaphragm seal 5.

Each valve body 14 has a conical contour facing the respective vacuum connection, 7, 7' with a cone apex 17 and with a circular cross-section 18 coming up against the valve sealing seat. In the region between the cone apex 17 and the circular cross-section, 18 recesses 19 are made in the conical contour of the valve bodies 14. These recesses 19 form overflow channels for the ventilating flow from a vacuum connection to the suction connection when the valve body 14 is pushed away from its valve sealing seat by a vacuum line 8, as shown at the vacuum connection 7'. The valve guides 16 guide the valve bodies 14 with slight radial play, so that a narrow, but sufficient flow cross-section is obtained along the valve bodies 14.

Besides being clamped on the outer periphery of the vacuum distributor box, 1 the diaphragm seal 5 is also supported all around the perforations 11 and all around a concertina segment or roller diaphragm 20 between the housing bottom part 2 and the cover 3. The supports all around the perforations 11 prevent the diaphragm seal 5 from moving aside during the insertion of vacuum lines 8, so that these can be pushed through the perforations 11, the bead-shaped edge 12 of the respective perforation 11 coming up against the vacuum line 8 in a manner of an O-ring seal.

A rubber toroidal sealing ring 21 is used on the suction connection 6.

The concertina segment or roller diaphragm 20 is stiffened and guided centrally by a rotationally symmetrical supporting body 22. A helical compression spring 23 is braced between an inner wall of the housing bottom part 2 and the supporting body 22 and via the latter presses the roller diaphragm 20 with an annular contact face 24 up against an obtusely conical contour 25 of the inner wall of the cover 3. The concertina segment 20 of the diaphragm seal 5, in conjunction with the obtusely conical contour 25 of the cover 3 and the weak helical compression spring 23, forms a protective valve 26 which in functional terms is likewise a non-return valve, but which is referred to differently here in order to distinguish it in terms of concept from the non-return valves 13. The protective valve 26 is opened counter to the force of the spring 23 as a result of pressure differences. An orifice 27 is provided in the supporting body 22 and in the roller diaphragm 20, within the annular contact face 24, as a flow passage.

A further orifice 28 in the clamping region of the roller diaphragm 20 outside the contact face 24 forms a flow channel between the non-return valve 13, shown on the left, at the vacuum connection 7' and the protective valve 26. This flow channel is continued through an aperture gap 29 provided in an annular part 30 which is formed integrally on the cover 3 and which extends concentrically all round the obtusely conical contour 25.

Figure 2:
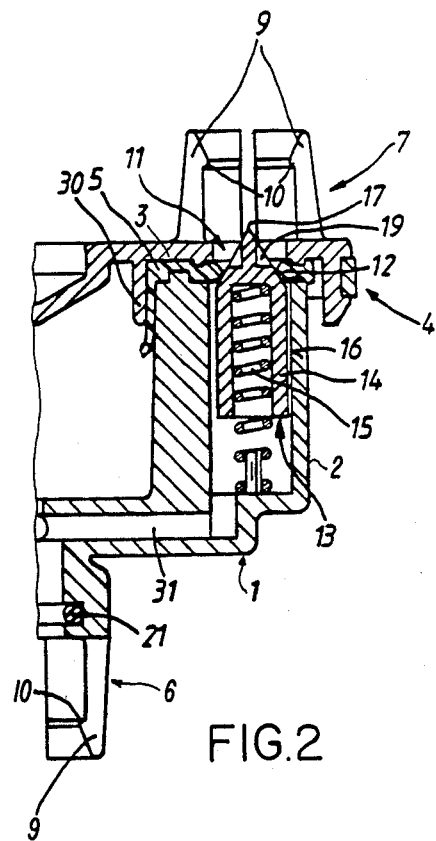
FIG. 2 is a partial, schematic sectional side view of a vacuum distributor box constructed according to a second embodiment of the invention wherein all the connections are closed off only by non-return valves.

The vacuum connection 7 is connected directly to the suction connection 6 via a channel 31. As already mentioned, further vacuum connections 7 (not shown) can be provided and connected directly to the suction connection 6. All the connections 7 can be closed off only by means of non-return valves 13 in accordance with an embodiment of the invention illustrated by FIG. 2.

Figure 3:
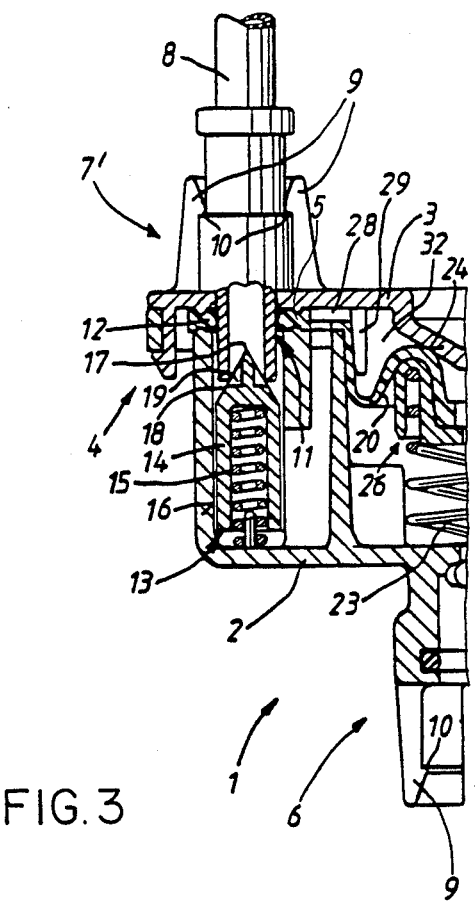
FIG. 3 is a partial, schematic sectional side view of a vacuum distributor box constructed according to a third embodiment of the invention wherein all the connections are closed off by both non-return valves and protection valve.

In contrast to this, the vacuum connection 7' shown and further vacuum connections 7' (not shown) can be closed off both as a group by means of the protective valve 26 and individually by means of non-return valves 13 as shown in FIG. 3. In fluidic terms, the protective valve 26 and the non-return valve 13 shown on the left are connected in series. The protective valve 26 closes off from the suction connection 6 a vacuum chamber 32, to which a group of vacuum connections 7' can be connected. Of course, further protective valves 26, vacuum chambers 32 and groups of vacuum connections 7' can be provided in the vacuum distributor box 1. During the production of the housing bottom part 2, the appropriate chamber walls and channels can be incorporated in the plastic injection moulding in a simply way, and likewise several concertina segments 20 and orifices 27, 28 can be formed integrally in the diaphragm seal 5.

A suction flow from a vacuum connection, 7' with an inserted vacuum line 8, to the suction connection 6 first passes through the recesses 19 of the valve body 14, flows past the pipe end of the vacuum line 8 resting on the conical contour of the valve body 14, reaches the valve guide 16, passes through the orifice 28 in the diaphragm seal 5 and the aperture gap 29 in the annular part 30 to the vacuum chamber 32, and finally flows through between the contact face 24 of the diaphragm seal 5 and the obtusely conical contour 25 of the cover 3 to the orifice 27 in the diaphragm seal 5 and in the supporting body 22 and lastly from there to the suction connection 6. Along this path, the flow is guided through the diaphragm seal 5 three times, first at the perforation 11, then through the orifice 28 and finally through the orifice 27.

By means of a protective valve 26, a particular group of vacuum connections 7' or a single one of these can be closed off in each case against an increase of pressure in the vacuum distributor box 1, even when vacuum lines 8 are inserted and the non-return valves 13 are open, whilst unoccupied connections 7 or 7′, the latter also in a group arrangement, are closed off by means of the non-return valves 13, so that there is no need for additional measures against ventilation, such as, for example, dummy plugs.

However, a principal advantage of the vacuum distributor box according to the invention is that only a small number of sealing parts is required, in particular two, namely the diaphragm seal 5 and the sealing ring 21 at the suction connection 6.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Vacuum distributor box with a suction connection and several vacuum connections on a housing, of which the vacuum connections intended for only the selective connection of vacuum lines are equipped with spring-loaded non-return valves, the spring-prestress force of which outweighs the maximum differential-pressure force occurring between the ambient pressure and the vacuum and the sealing effect of which is cancelled only as a result of the insertion of the vacuum lines to be connected selectively and the mechanical displacement of their valve bodies by the vacuum lines, wherein the housing of the vacuum distributor box is made in two housing parts and is sealed off relative to the outside by means of as elastic diaphragm seal which is clamped on all sides between the two housing parts and which has, in respective mouth regions of the vacuum connections, a number of perforations corresponding to the number of vacuum connections and wherein the perforations of the diaphragm seal have sealing faces at their edges which are designed, on the one hand, as valve sealing seals of the non-return valves of the vacuum connections and, on the other hand, as annular seals for the connected vacuum lines.

2. Vacuum distributor box according to claim 1, further comprising at least one protective valve which opens against spring force when subjected to a vacuum via the suction connection and is arranged between the suction connection and at least oen vacuum connection and which, when ambient pressure enters the distributor box, comes up against a housing inner wall by means of an annular contact face, wherein the protective valve is formed integrally in the diaphragm seal as a roller diaphragm with an orifice within the contact face, the roller diaphragm being clamped on all sides between the housing parts and having at least one further orifice which extends through its clamped portion and is located outside the contact face and which is arranged between the non-return valve at the respective vacuum connection and the protective valve in relation to an air flow from vacuum connection to suction connection.

3. Vacuum distributor box according to claim 2, wherein both vacuum connections which can be closed off only by means of a non-return valve and vacuum connections which can be closed off by means of a non-return valve and a protective valve are arranged next to one another.

4. Vacuum distributor box according to claim 1, wherein the vacuum connections, and the suction connection have resilient retention tongues with locking noses which make it possible to insert and lock in a simple way the vacuum lines to be connected.

5. Vacuum distributor box according to claim 2, wherein the vacuum connections, and the suction connection have resilient retention tongues with locking noses which make it possible to insert and lock in a simple way the vacuum lines to be connected.

6. Vacuum distributor box according to claim 1, wherein the valve bodies of the non-return valves have a conical contour at their ends facing the respective vacuum connections, and wherein at least one recess is made in the conical contour in the region between the cone apex and the circular cross-section of the valve bodies which comes up against the respective valve sealing seat.

7. Vacuum distributor box according to claim 1, wherein the edges of the perforations are formed, bead-shaped, in the diaphragm seal in the manner of toroidal sealing rings.

* * * * *